Oct. 5, 1937.                J. E. LOVELY                2,094,995
                         FEED MECHANISM CONTROL
                    Filed July 18, 1936        7 Sheets-Sheet 1

Inventor
John E. Lovely
by Wright, Brown, Quinby & May
Attys

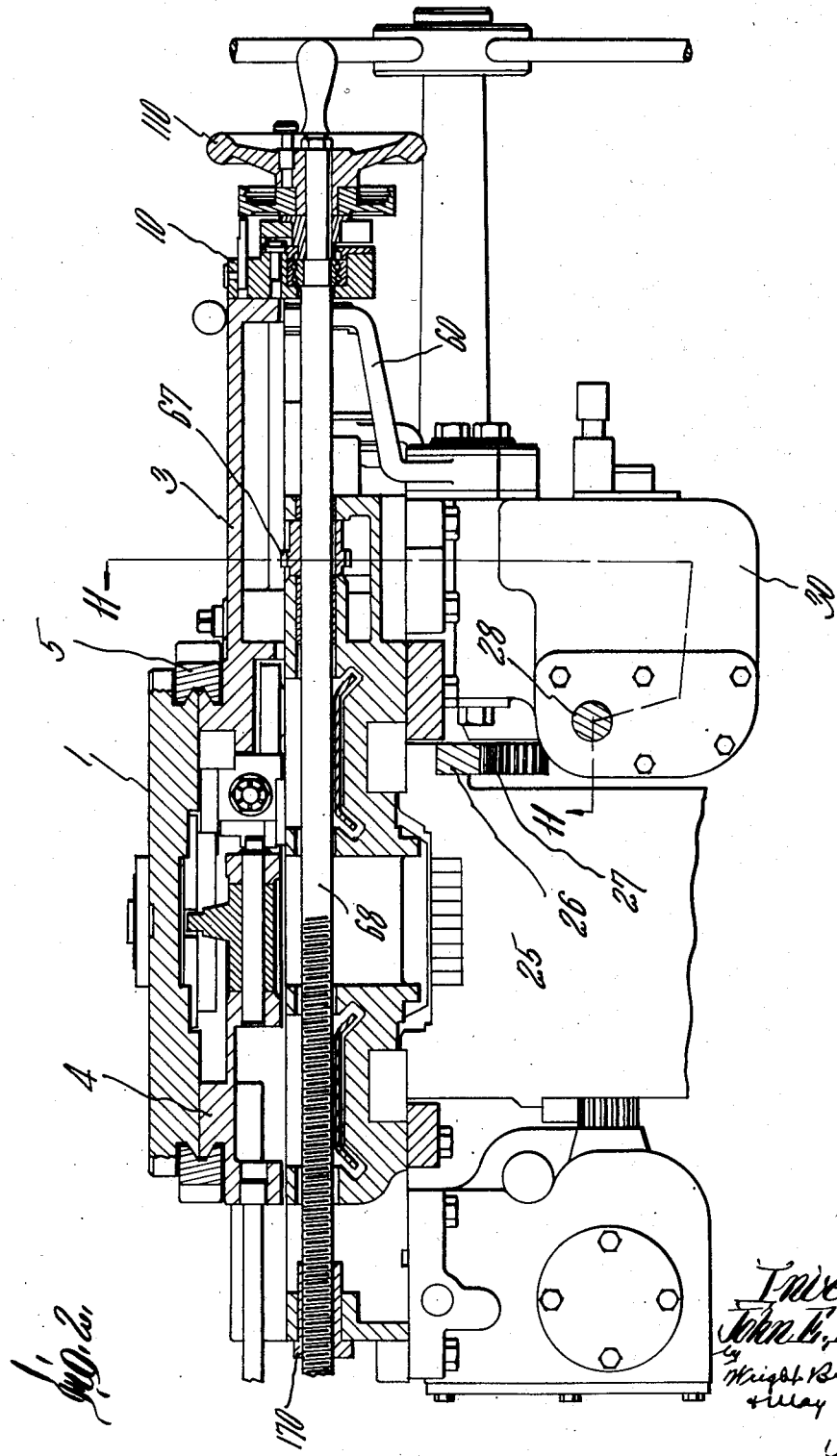

Oct. 5, 1937.  J. E. LOVELY  2,094,995
FEED MECHANISM CONTROL
Filed July 18, 1936   7 Sheets-Sheet 3
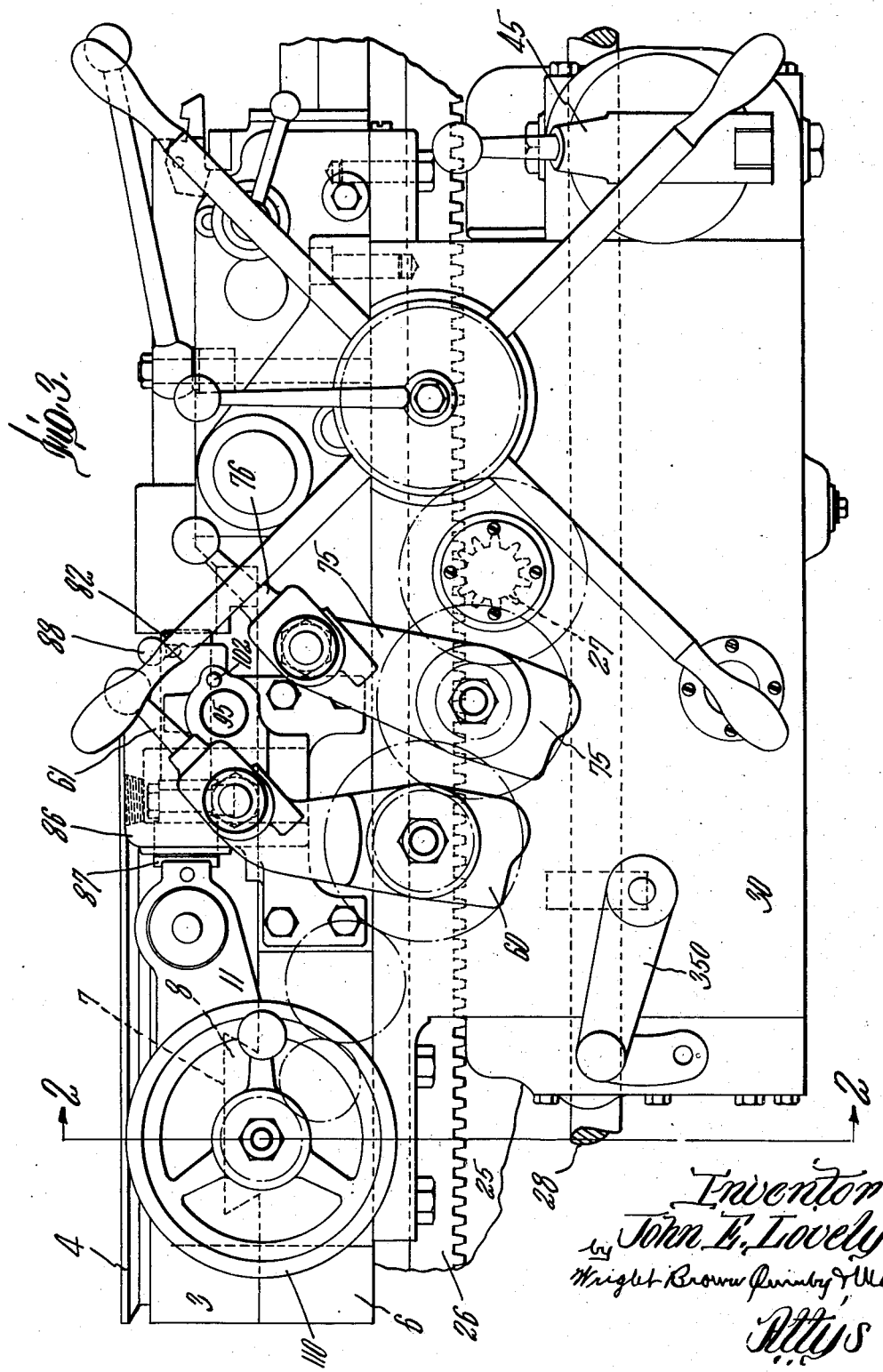

Oct. 5, 1937. J. E. LOVELY 2,094,995
FEED MECHANISM CONTROL
Filed July 18, 1936 7 Sheets-Sheet 4
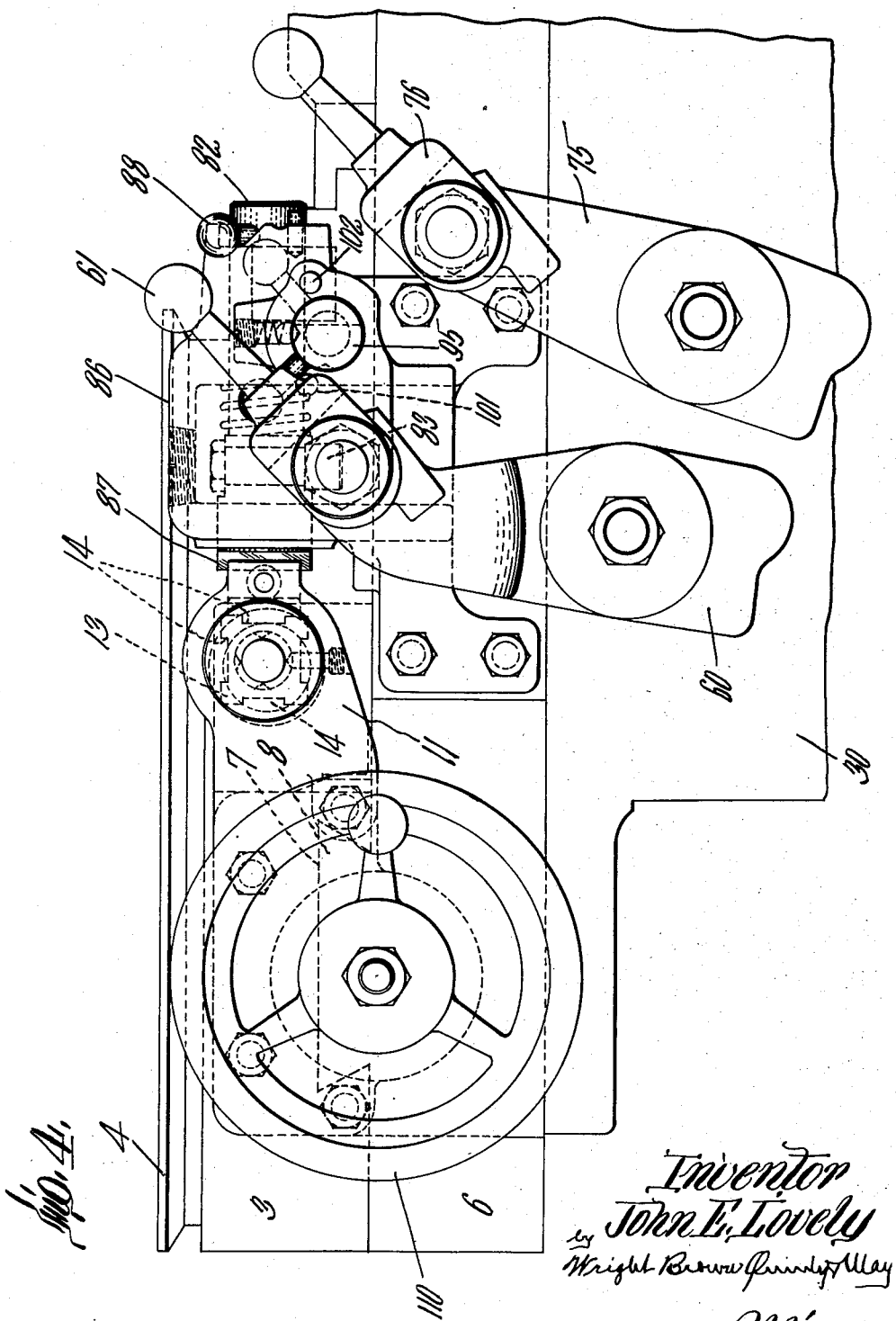

Oct. 5, 1937.    J. E. LOVELY    2,094,995
FEED MECHANISM CONTROL
Filed July 18, 1936    7 Sheets-Sheet 5
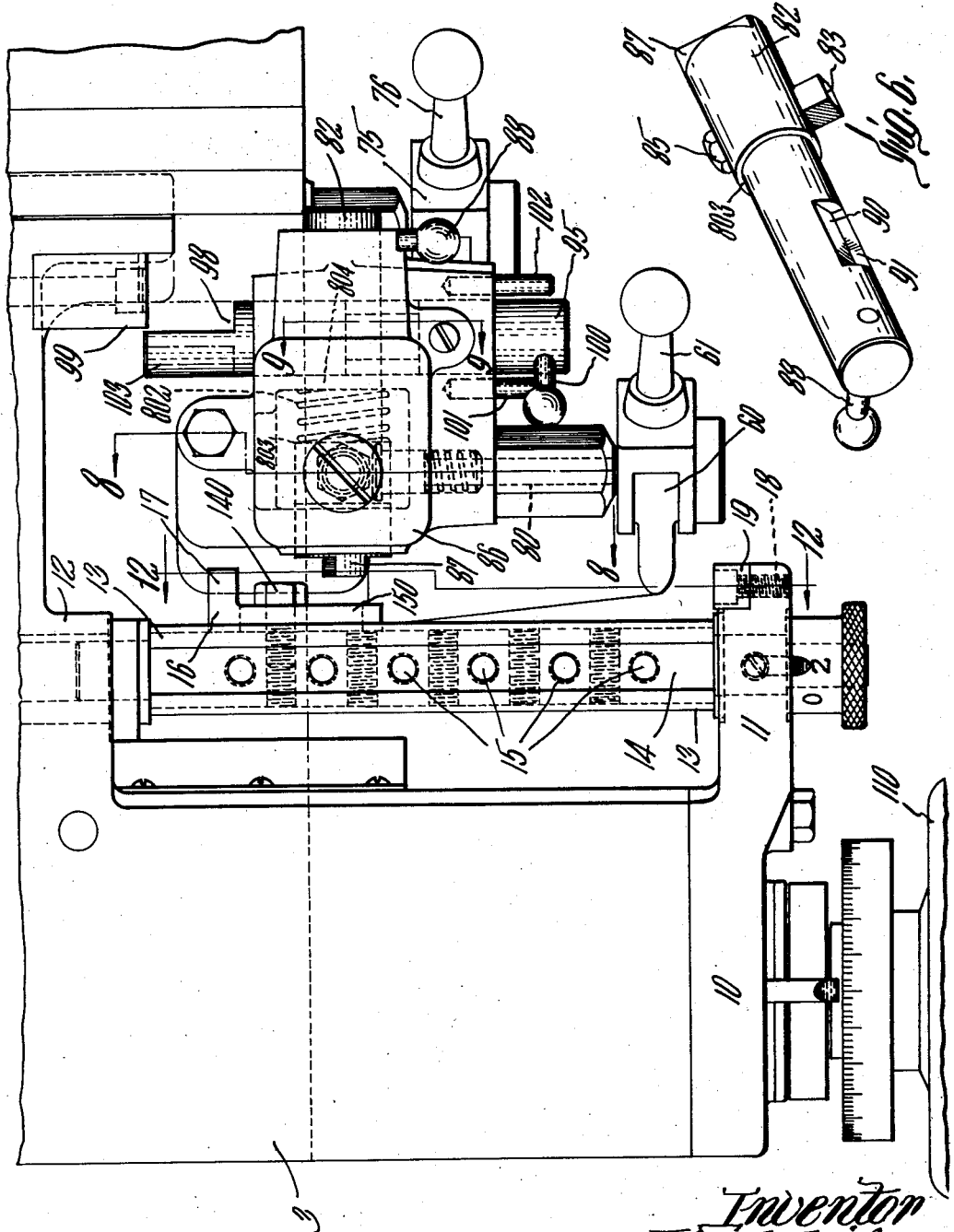

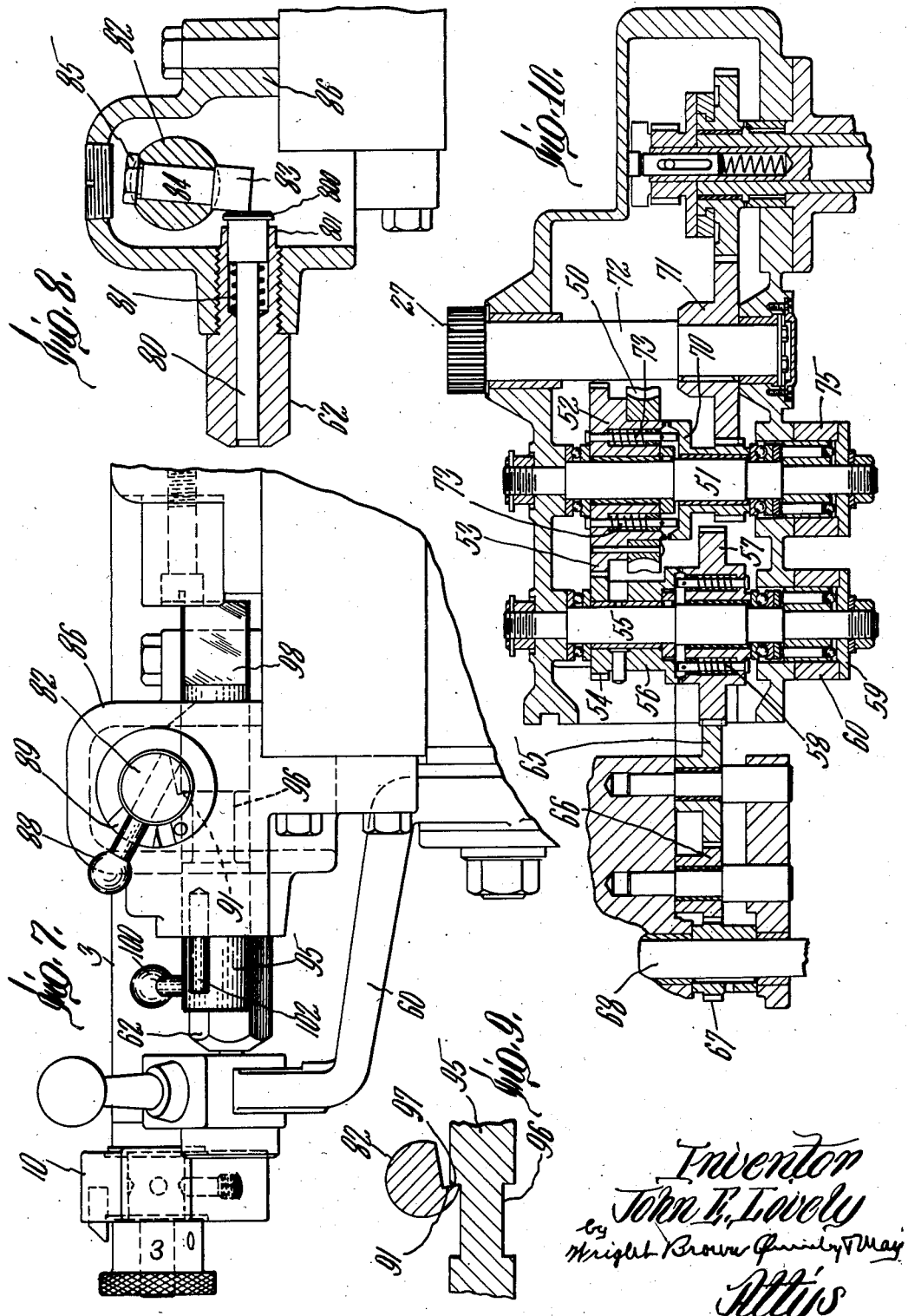

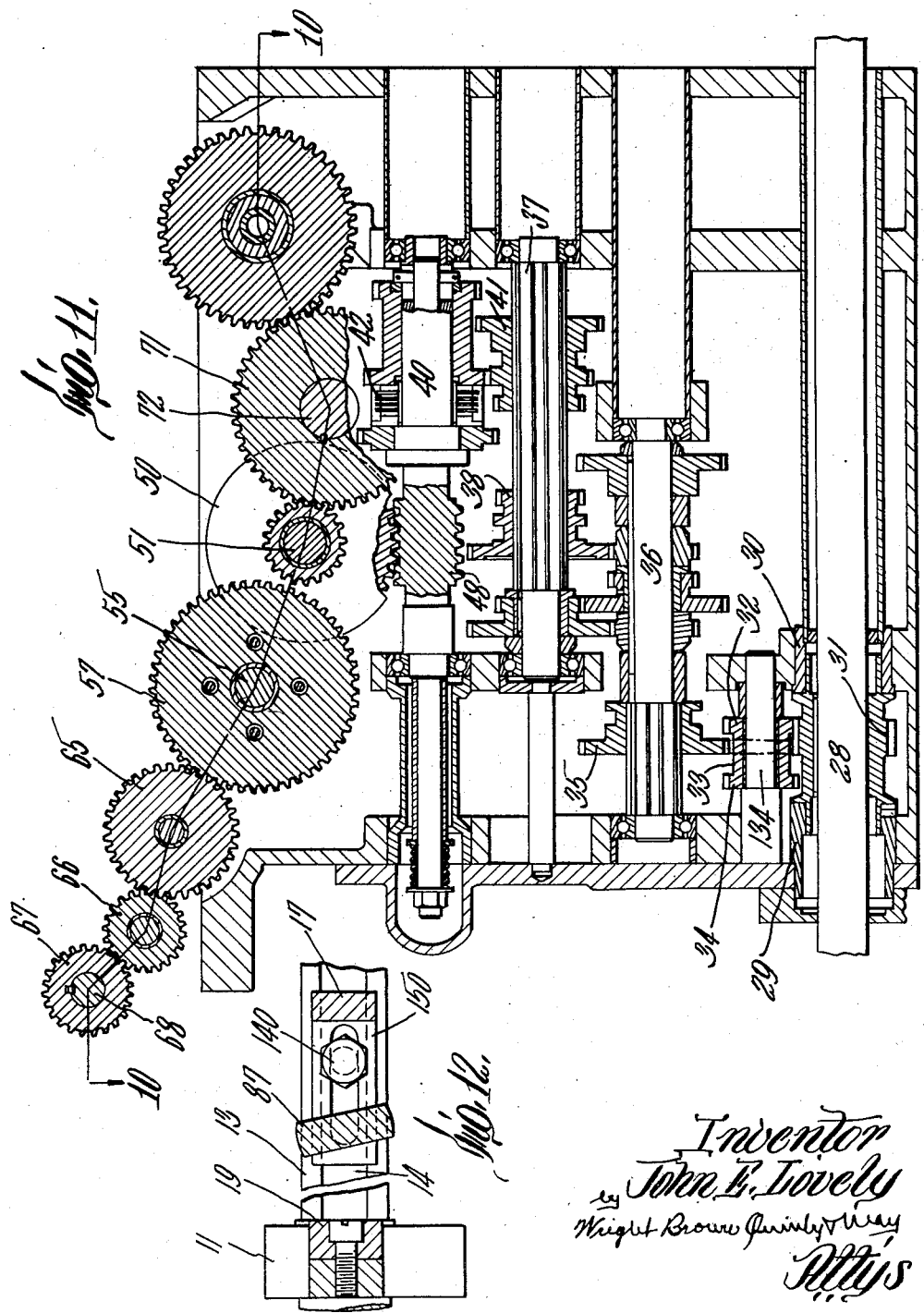

Patented Oct. 5, 1937

2,094,995

UNITED STATES PATENT OFFICE 2,094,995

FEED MECHANISM CONTROL

John E. Lovely, Springfield, Vt., assignor to Jones & Lamson Machine Company, Springfield, Vt., a corporation of Vermont Application July 18, 1936, Serial No. 91,336

11 Claims. (Cl. 29—65)

This invention relates to mechanism for effecting a feed of a tool relative to work, and while developed more particularly in connection with the cross feed of a tool-carrying turret of a turret lathe, in many of its aspects it is not limited to such use, but is applicable generally to similar problems. More especially it relates to mechanism for controlling the power feed and defining its limits of motion.

One of the objects of this invention is to provide for a plurality of limit stops selectively presentable into operative position for automatically stopping the feed at desired limits.

A further object of the invention is to provide sets of stops, each set being independently adjustable and any selected set being effective while the others are inoperative to determine the feed limits in opposite directions.

Another object is to provide for positive stopping of the motion when the power has been disconnected at the desired limits.

A further object of this invention is to provide means for automatically stopping the motion of the turret or other tool-carrying member in its retraction in its normal central position.

Still another object is to provide means whereby stops may be rendered inoperative but without changing their adjustments, so that when it is desired that they be again operative they will operate exactly as before they were rendered inoperative.

For a more complete understanding of this invention and further objects and advantages thereof, reference may be had to the accompanying drawings, in which Figure 1 is a fragmentary top plan of a turret lathe embodying the invention.

Figure 2 is a detail section on line 2—2 of Figures 1 and 3.

Figure 3 is a fragmentary left hand elevation of the parts shown in Figure 1.

Figure 4 is a view similar to a portion of Figure 3, but to a larger scale and showing certain parts more in detail.

Figure 5 is a fragmentary plan view of parts shown in Figure 4, and to the same scale.

Figure 6 is a perspective view of a rock shaft for actuating the feed knock-off mechanism.

Figure 7 is a fragmentary right end elevation of parts shown in Figures 4 and 5.

Figure 1:
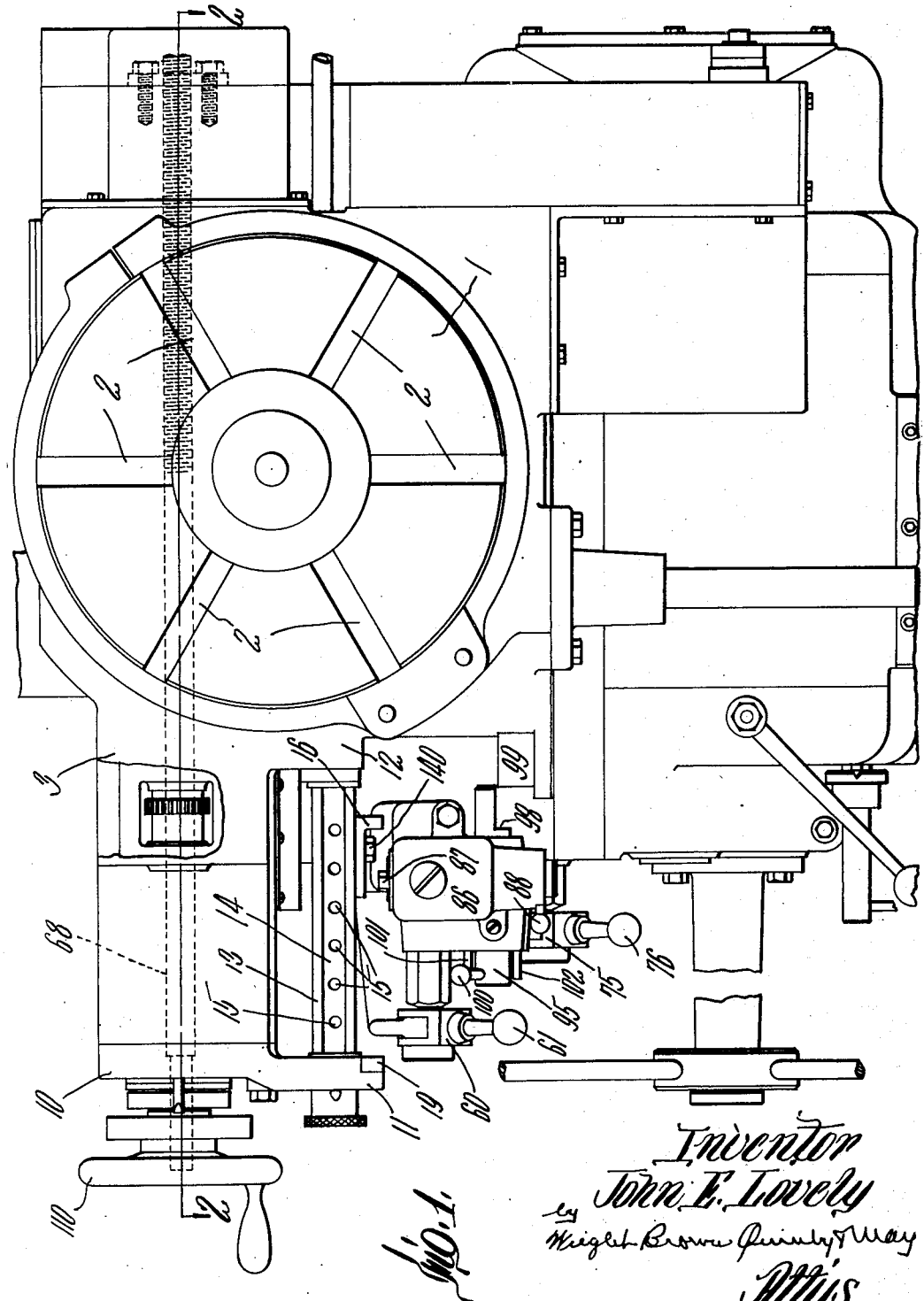

Figures 8 and 9 are detail sections on lines 8—8 and 9—9, respectively, of Figure 5.

Figure 10 is a detail section on line 10—10 of Figure 11.

Figure 11 is a detail section on line 11—11 of Figure 2.

Figure 12 is a detail section on line 12—12 of Figure 5.

In the drawings this invention is illustrated as applied to a turret lathe with more particular relation to the control of the traversing motion of the turret saddle which constitutes the tool carriage and a rectilinear in and out feed motion of a slide on the saddle which directly carries the turret mechanism.

Referring to these drawings, at 1 is shown the base of a turret having therein suitable ways 2 arranged radially in which may be secured the various holders for the desired tools on the turret. This turret base 1 is shown as rotatably mounted on a cross slide 3 provided with a circular boss 4 (see Figure 2) directly supporting the turret base 1 and to which this turret base may be clamped between indexing motions as by a clamp ring 5. Suitable mechanism not material to this invention may be employed to index and lock the turret and to actuate the clamping mechanism at suitable times.

The slide 3 is mounted to slide on the turret saddle 6, being shown in Figures 3 and 4 as provided with a dovetail groove 7 in which engages a guide 8 carried by the saddle 6. To the forward end of this slide 3 is secured a front plate 10 (see Figure 5) having a lateral extension 11 and journaled in this extension 11 and a portion 12 of the slide 3 opposed thereto is a bar 13. This bar, as shown, is square in cross section, though it might have other polygonal or circular section, and on each of its faces it is provided with a guide groove 14. At intervals along the guide groove are positioned threaded holes 15 and in the case of a square bar these holes may extend entirely through the bar. These holes are for the reception of clamping bolts such as 140 which pass through longitudinally slotted base portions 150 of angle stop elements 16, each of which has an end portion 17 projecting outwardly from its outer face. These stop members 16 are formed to seat in the grooves 14 and to be held in alinement with the bar 13 thereby. By reason of the plurality of threaded holes in the bar and the slotted base of each of these stops, the stops may be positioned as desired along the length of the bar 13 and one or two stops may be applied to each face of the bar. The stops are thus independently adjustable on each side of the bar and any selected stop or pair of stops may be brought into operative position by turning of the bar 13 while all the others are out of operative position.

In Figure 5 but one of these stops is shown, this being in operative position. To the inner face of the slide extension 11 may be secured, as by a bolt 18, a fixed stop 19 which, as will later appear, is a safety stop to prevent over-travel inwardly of the turret cross slide at any time.

These stops determine the cross feed limits of the turret which is actuated by power by means which will now be described. The turret saddle is mounted for traversing motion on the bed 25 of the machine which is commonly provided, as shown in Figures 2 and 3, with a rack bar 26 with which engages a feed pinion 27. Also extending along the length of the bed is a rotatable power feed shaft 28 which is rotated by any suitable means in a well understood manner. The turret saddle has an apron portion 30 extending downwardly over the forward face of the bed and forwardly of the rack bar 26 and through which the feed shaft 28 extends. As shown best in Figure 11, the feed shaft 28, within the apron, has keyed thereto between shoulder members 29 and 30, which hold it in fixed axial position with reference to the apron, a long gear 31. With this gear meshes a short gear portion 32 on a sleeve 33 journaled on a stub shaft 134 and this sleeve 33 has a second gear 34 of the same size as the gear 32. This sleeve and the two gears 32 and 34 provide a reverse drive connection which can be rendered either operative or idle to determine the direction of feed of the cross slide and also the direction of traverse of the turret saddle. This is done by means of a sliding gear 35 keyed to a shaft 36. This gear may be brought selectively into engagement with the long gear 31 in which case the shaft 36 is rotated in one direction opposite to that of the long gear, or it may be moved axially out of meshing relation with the long gear 31 and into meshing relation with the gear 34 in which case the shaft 36 will be driven in the other direction, which is the same as that of the long gear 31, from this long gear through the reverse sleeve 33, instead of directly from the long gear. This sliding gear may be moved from one to the other of its positions by moving the handle 350 (Figure 3).

The shaft 36 drives a shaft 37 at any selected one of a plurality of variable speeds through the slidable gear sleeve 38 and the shaft 37 is in driving relation to another shaft 40 through a second sliding gear sleeve 41 and a safety slip clutch 42. These sliding gears may be actuated in any suitable manner, for example, as shown in my patent application Serial No. 738,772, filed August 7, 1934, for Lathe and the like speed control mechanism, through manipulation of the handle shown at 45 in Figure 3.

The shaft 40 carries a worm 48 which meshes with a worm wheel 50 journaled on a transverse shaft 51 (see Figures 10 and 11). This worm wheel 50, as shown in Figure 10, is in the form of a ring which is secured to a sleeve 52 and the sleeve 52 has a gear portion 53 thereon which meshes with a gear 54 journaled on a shaft 55. This gear 54 is shown as integral with a sleeve 56 having a clutch face with which may engage a similar clutch face on a sleeve 57 which is axially movable on the shaft 55 into and out of clutching relation with the sleeve 56. It is biased out of clutching relation by springs 58, but may be held in clutching engagement by a cam plate 59 of a knock-off lever 60. This knock-off lever may be arranged as shown in my Patent No. 2,006,144, granted June 25, 1935, for Feed knock-off mechanism for lathes, and includes the lever 60 and a handle portion 61 pivotally connected thereto at its outer end and which may be held in clutching position by engagement with a latch mechanism at 62, as shown more in detail in my Patent No. 2,006,144, to which reference has been made. The gear 57 acting through intermeshing gears 65 and 66, drives a pinion 67 keyed to a cross feed screw shaft 68 (see Figures 2 and 10). This shaft 68 is held against axial motion relative to the turret cross slide 3 and has threaded engagement in a nut 170 carried by the turret saddle. Thus when the knock-off mechanism is in the position shown in the figures of the drawings, rotation of the feed shaft 28 will produce transverse motion in one or the other direction of the turret slide, the particular direction depending on the position of the gear 35.

The sleeve 52 which is driven by the worm 48 may also drive, through its clutching engagement with an axially movable gear-carrying clutch element 70, a gear 71 keyed to the shaft 72, which carries the feed pinion 27 (see Figure 10). The clutch sleeve 70, which is biased to clutch-open position by springs 73, is held in clutching position by a second knock-off mechanism comprising the knock-off lever 75 with a handle portion 76. This knock-off mechanism, which controls the stopping of the saddle traverse, may be actuated by suitable stops (not shown) carried by the machine bed as illustrated in my Patent No. 2,006,144, to which reference has already been made.

It will thus be seen that the turret saddle may be traversed by power in either direction and the turret slide may be given in and out feed motions by power, each of these motions, however, being independently controlled at its limits by independent knock-off mechanisms, and that the motions of both may be in either desired direction, one direction of motion of one of these movable parts, however, being associated with a single direction of motion of the other since the reverse mechanism is in the train of gearing between the power shaft and the separate drives for the saddle traverse and the slide cross feed.

The present invention is particularly concerned with the knock-off actuating mechanism for the cross slide. This knock-off may be actuated to positively stop the cross feed at any of a plurality of selected positions determined by the angular positioning of the stop shaft 13 and the position of the stops axially on the operating face thereof and it may also be controlled to positively stop the traverse automatically when it reaches mid-position on the outward direction of motion of the turret slide. The knock-off lever 60 for the cross slide may be released by release of the latch mechanism shown more particularly in Figure 8, this comprising a release pin 80 normally held in retracted position as by a spring 81, but acting when projected in the manner shown in my Patent No. 2,006,-144 to release the knock-off lever 60 so that it can swing down into position where the clutch 57 is out of clutching engagement with the mating driving member 56 shown in Figure 10. This projection of the latch release pin 80 is produced by the rocking of a rock shaft 82 shown detached in Figure 6. This rock shaft 82 has secured thereto a lateral projection 83, this being shown as comprising the head of a plug 84 passing through the rock shaft 82 and secured in position as by a nut 85 threaded on its reduced opposite extremity. This shaft 82 is journaled for rocking motion in a casing member 86 carried by the turret saddle and at one end, which is that toward the rock bar 13, opposite sides are cut away to form a substantially rectangular projection 87 which lies in the normal path of motion of that stop 16 which is in proper angular position for operative relation thereto, as shown in Figure 12. It also may be struck by the stop 19 provided the inward motion of the cross slide is sufficient and there is no separate stop for this direction carried by the bar 13 in the proper angular position. In the normal angular position of the rock shaft 82, the portion 87 is inclined as shown in Figure 12 so that should it be engaged by the portion 17 of the stop 16 it will be rocked toward vertical position. It will also be rocked in the same direction should it be contacted on the other side by the stop 19, or by a stop on the same side, as the stop 19, but carried by the bar 13. In either case the bar is rocked in a direction to move the projection 83 to the left, as shown in Figure 8, thus to project the latch release pin 80 and release the knock-off lever so as to disconnect the power feed to the cross slide in whatever direction it may be traveling. The pin 80 is provided with a head 800 which may engage the adjacent end of its sleeve 801. This limits the extent of rocking of the rock shaft 82 in knock-off direction and thereby forms a positive stop for the feed slide whenever the knock-off is actuated. The opposite end of the bar 82 may carry a handle 88 projecting through a slot 89 in the end of the casing 86 for hand manipulation of the bar 82 and to permit it to be withdrawn axially against the action of the spring 802 from cooperative relation with the stop 16. By turning the handle 88 out of registry with the slot 89, the bar 82 may be retained out of operative position, whereupon all the stops which could cooperate with the portion 87 in its operative position are rendered inoperative, but without changing their adjustments. They may be rendered operative at any time desired by turning the handle 88 into registry with the slot 89 and allowing the spring 802 to return the bar 82 to its operative axial position. As shown in Figure 5 the spring 802 reacts between an annular shoulder 803 on the bar and a wall portion 804 of the casing part 86.

Beside this automatic adjustabe knock-off, it is desirable that means be provided for insuring the return of the cross slide to its normal exact mid-position when this is desired. To this end the rock shaft 82 is shown as provided with a cut away portion 90 forming a shoulder 91 and beneath this rock shaft 82 is positioned a second rock shaft 95 at right angles thereto. The rock shaft 95 has a portion 96 of reduced diameter to provide an annular shoulder 97 which may contact with the shoulder 91 and rock the shaft 82 in release direction on axial motion forwardly of the rock shaft 95. This rock shaft 95 is journaled transversely in the casing part 86 and is provided at its inner end with a cut-out portion 98, which in the position shown in Figure 5, permits a part 99 carried by the turret cross slide to pass forwardly beyond the position shown in this figure without contact with the rock shaft 95, so that the cross slide can be moved forwardly toward the operator in this position of the rock shaft beyond its central position. The forward end of the rock shaft 95, however, is provided with a handle 100 which may rest on either of a pair of stop pins 101 and 102. In the position shown in Figure 5, it rests on the stop pin 101 in which angular position of the rock shaft 95 the cross slide may move forwardly of the mid-position. The end of the cut 98 acts as a limit stop for out motion of the slide just as the part 19 acts as a rearward stop. When, however, the handle 100 is moved over to engage on the pin 102, the extremity 103 of the shaft 95 is brought into alinement with the stop 99, whereby motion of the cross slide forwardly toward its mid-position will engage the inner end of the rock shaft 95 and move it axially to an amount sufficient to rock the shaft 82 to release the cross feed knock-off mechanism and then to positively stop further feed forwardly of the cross slide when mid-position of the turret has been reached.

Beside the power cross feed, the usual hand feed produced by the rotation of a hand wheel 110 on the forward end of the feed screw 68 may be provided, provision being made, as is well known, by which this wheel may be coupled to the cross feed screw for rotating it when desired.

From the foregoing description of an embodiment of this invention, it should be evident to those skilled in the art that various changes and modifications may be made without departing from the spirit or scope of this invention as defined by the appended claims.

I claim:

1. In combination, a pair of members, one for supporting work and the other for supporting a tool, power means for moving one of said members relative to the other, knock-off mechanism actuable to operatively disconnect said power means from said movable member, a rock shaft having a flattened portion and carried by one of said members, relatively fixed stops carried by the other of said members and between which said portion may move as said movable member moves, means actuated by the rocking of said rock shaft toward an angular position to which it may be moved by pressure of either of said stops thereon to actuate said knock-off mechanism, and means biasing said rock shaft to a different angular position.

2. In combination, a pair of members, one for supporting work and the other for supporting a tool, power means for moving one of said members relative to the other, knock-off mechanism actuable to operatively disconnect said power means from said movable member, a rock shaft having a flattened portion and carried by one of said members, relatively fixed stops carried by the other of said members and between which said portion may move as said movable member moves, means actuated by the rocking of said rock shaft toward an angular position to which it may be moved by pressure of either of said stops thereon to actuate said knock-off mechanism, means for positively limiting the rocking of said rock shaft in releasing direction to thereby positively stop the motion of said movable member on actuation of said mechanism, and means biasing said rock shaft to a different angular position.

3. In combination, a pair of members, one for supporting work and the other for supporting a tool, power means for moving one of said members relative to the other, knock-off mechanism actuable to operatively disconnect said power means from said movable member, a rock shaft having a flattened portion, means actuable by the rocking of said rock shaft to a predetermined position to actuate said mechanism, a stop movable from and to a position to cooperate with said flattened position to turn said shaft to said angular position when said movable member reaches a predetermined position in its motion, and means biasing said rock shaft away from said angular position.

4. In combination, a pair of members, one for supporting work and the other for supporting a tool, power means for moving one of said members relative to the other member, knock-off mechanism actuable to operatively disconnect said power means from said movable member, a stop carried by said movable member, a rock shaft carried by said other member and capable of axial motion in the direction of movement of said one member, said rock shaft having an eccentrically disposed end portion lying in one angular position of said rock shaft in the path of motion of said stop and in another angular position being out of said path, and means actuated by axial motion of said rock shaft by pressure of said stop against said end portion for actuating said knock-off mechanism.

5. In combination, a pair of members, one for supporting work and the other for supporting a tool, power means for moving one of said members relative to the other member, knock-off mechanism actuable to operatively disconnect said power means from said movable member, a stop carried by said movable member, a rock shaft carried by said other member and capable of axial motion in the direction of movement of said one member, said rock shaft having an eccentrically disposed end portion lying in one angular position of said rock shaft in the path of motion of said stop and in another angular position being out of said path, said rock shaft also having a portion lying in the path of motion of said stop when said eccentrically disposed portion is out of said path and forming a safety stop defining the maximum limit of motion of said movable member in one direction, and means actuated by axial motion of said rock shaft by pressure of said stop thereagainst for actuating said knock-off mechanism.

6. In combination, a pair of members, one for supporting work and the other for supporting a tool, power means for moving one of said members relative to the other member, knock-off mechanism actuable to operatively disconnect said power means from said movable member, a stop carried by said movable member, a rock shaft carried by said other member and capable of axial motion in the direction of movement of said one member, said rock shaft having an eccentrically disposed end portion lying in one angular position of said rock shaft in the path of motion of said stop and in another angular position being out of said path, said rock shaft also having a portion lying in the path of motion of said stop when said eccentrically disposed portion is out of said path and forming a safety stop defining the maximum limit of motion of said movable member in one direction, means defining the maximum limit of motion of said movable member in the opposite direction, and means actuated by axial motion of said rock shaft by pressure of said stop thereagainst for actuating said knock-off mechanism.

7. A lathe having a bed, a carriage traversing said bed, a slide on said carriage mounted for motion transverse to said traversing motion, a rotary power shaft arranged along said bed, driving connections from said shaft for traversing said carriage and for moving said slide, said connections including independent knock-off mechanisms for said carriage and said slide, and dogs carried by said carriage for actuating said slide knock-off mechanism at desired limits of motion of said slide.

8. In combination, a pair of members, one for supporting work and the other for supporting a tool, means for moving one of said members relative to the other, a plurality of relatively adjustable stops selectively presentable into operative position to stop such relative motion of said members at predetermined points depending on the stop selected, and means for rendering said stops inoperative while maintaining them in their relative adjusted positions.

9. In combination, a pair of members, one for supporting work and the other for supporting a tool, power means for moving one of said members relative to the other, a knock-off mechanism actuable to operatively disconnect said power means from said moving member, a knock-off actuating member, a plurality of relatively adjustable stops for selective cooperation with said member to actuate said knock-off mechanism at points determined by the selected stops, and means actuable to move said member out of cooperative relation to such selected stops.

10. In combination, a pair of members, one for supporting work and the other for supporting a tool, power means for moving one of said members relative to the other, a knock-off mechanism actuable to operatively disconnect said power means from said moving member, a rock shaft acting when rocked to a definite angular position to actuate said knock-off mechanism, adjustable stops for selective cooperation with said rock shaft to turn said shaft to said angular position at positions of said movable member determined by the adjustment of said stops, and means actuable to move and retain said shaft axially from its normal operative position out of cooperative relation to said stops.

11. In combination, a pair of members, one for supporting work and the other for supporting a tool, power means for moving one of said members relative to the other, knock-off mechanism actuable to operatively disconnect said power means from said movable member, a rock shaft having a flattened portion, means actuable by the rocking of said rock shaft to a predetermined position to actuate said mechanism, a stop movable from and to a position to cooperate with said flattened position to turn said shaft to said angular position when said movable member reaches a predetermined position in its motion, means biasing said rock shaft away from said angular position, and means actuable to withdraw said rock shaft axially from cooperative relation to said stop.

JOHN E. LOVELY.